United States Patent [19] [11] 3,753,169
Condon [45] Aug. 14, 1973

[54] BANDPASS FILTER USING PLURAL COMMUTATING CAPACITOR UNITS

[75] Inventor: Joseph Henry Condon, Summit, N.J.

[73] Assignee: Bell Telephone Laboratories, Incorporated, Murray Hill, N.J.

[22] Filed: Aug. 9, 1972

[21] Appl. No.: 279,019

[52] U.S. Cl. .................. 333/70 A, 328/167, 333/76
[51] Int. Cl. .......................... H03h 7/10, H03h 7/16
[58] Field of Search .................. 333/70 R, 76, 70 A; 328/165, 167

[56] References Cited

UNITED STATES PATENTS

| | | | |
|---|---|---|---|
| 2,752,491 | 6/1956 | Ringoen | 333/70 A |
| 2,584,986 | 2/1952 | Clark | 333/70 A |
| 2,521,690 | 9/1950 | Clark | 333/70 A |
| 3,469,213 | 9/1969 | Baker | 333/70 R X |
| 3,514,726 | 5/1970 | Poschenrieder | 333/70 R |
| 3,526,858 | 9/1970 | Heinlein et al. | 333/70 R |

*Primary Examiner*—Rudolph V. Rolinec
*Assistant Examiner*—Marvin Nussbaum
*Attorney*—R. J. Guenther et al.

[57] ABSTRACT

Plural commutating capacitor, 2-terminal, impedance devices are substituted for plural inductance-capacitance circuits in shunt branches of a 3-element $\pi$-section bandpass filter. Commutation switch drives for the units are provided at 30 electrical degrees phase difference, but at the same frequency.

8 Claims, 4 Drawing Figures

BANDPASS FILTER USING PLURAL COMMUTATING CAPACITOR UNITS

BACKGROUND OF THE INVENTION

1. Field of the Invention

This invention relates to electrical filter circuits; and it relates, in particular, to dynamic bandpass filters employing commutating capacitor impedance devices.

2. Description of the Prior Art

A commutating capacitor impedance device, sometimes called a commutating capacitor unit, is employed as a bandpass filter as set forth in my copending application Ser. No. 254,384, filed May 18, 1972, and entitled "Commutating Capacitor Impedance Device." The response of such a device is centered about the frequency at which the capacitors of the commutating capacitor unit are recurrently switched through the commutating sequence. The breadth of the response can be changed by changing the capacitance of the capacitors employed in the device, but such a change simply decreases the slope of the response at the band edges without greatly increasing the width of the maximum response portion of the band. Attempts to increase the bandwidth at maximum response by utilizing plural commutating capacitor units, driven in step through their commutating sequences, in different shunt branches of a $\pi$-section filter configuration, do not produce the desired result. It was found that the resulting response was essentially similar to that of a single commutating capacitor unit, as set forth in my aforementioned application.

STATEMENT OF THE INVENTION

In an illustrative embodiment of the present invention, the aforementioned difficulty of increasing bandwidth at high response is overcome by driving, in different phases, plural commutating capacitor units which are connected in different shunt branches of a bandpass filter configuration.

BRIEF DESCRIPTION OF THE DRAWINGS

A more complete understanding of the present invention and the various features, objects, and advantages thereof may be obtained from a consideration of the following detailed description in connection with the appended claims and the attached drawings in which:

DETAILED DESCRIPTION

Figure 1A:
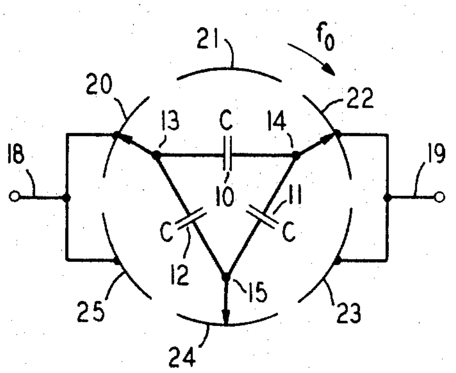
FIG. 1A is a simplified schematic diagram of a commutating capacitor unit employed in the present invention.

In FIG. 1A there is presented in simplified form a commutating capacitor unit of the type described in my aforementioned application. Briefly, three capacitors 10, 11, and 12 of equal capacitance are connected in a delta circuit configuration having apex terminals 13, 14, and 15, which are connected in different pair combinations between an input connection 18 and an output connection 19 of the unit. The different combinations of terminal connections are achieved by a commutating switching arrangement which, in effect, rotates the delta circuit clockwise at a frequency $f_0$ so that the apex terminals of the delta circuit are alternately brought into contact with different sets of three contacts of a commutating switch which includes contacts 20, 21, 22, 23, 24, and 25. It is apparent from the described cyclic switching of terminal connections, and it is also shown in my aforementioned application, that each capacitor connection combination of the illustrated embodiment always includes at least two capacitors between the unit input and output connections. Two of those capacitors in each combination are in series between the input and the output, and each of the two capacitors of a combination is also part of a different one of the combinations, respectively. It is also apparent that each such capacitor combination is included once with each polarity, with respect to connections 18 and 19, in each cycle of the commutation. Thus, in each phase of each commutation cycle the function of each capacitor changes with respect to the unit input and output connections. In actual practice the commutating switching is advantageously accomplished by electronic switching arrangements, two of which are disclosed in my aforementioned application. All of the three capacitors of the delta circuit advantageously have approximately the same capacitance C. Signal conditions observed across the device of FIG. 1A, when an electrical signal is applied across the connections 18 and 19, indicate a response which resembles the response of a parallel inductance-capacitance (LC) circuit. In particular, maximum response is realized for an input signal frequency which is equal to the commutation frequency $f_0$.

Figure 1B:
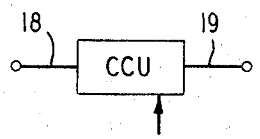
FIG. 1B is a schematic representation of such a unit.

FIG. 1B is a schematic representation of the 2-terminal impedance device illustrated in FIG. 1A. This representation is considered to include the means, of whatever form, utilized for achieving the commutation switching. However, an arrow with a reference character is added to the representation, when plural units are employed, to differentiate between commutation drives therefor.

Figure 2:
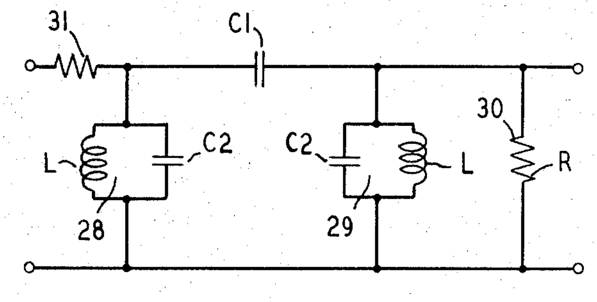
FIG. 2 PRIOR ART
FIG. 2 is a schematic diagram of a 3-element $\pi$-section static bandpass filter of the prior art.

FIG. 2 illustrates a well-known 3-element $\pi$-section bandpass filter, which includes a capacitor C1 in series in the signal path and two parallel LC circuits 28 and 29 connected in the respective shunt branches of the filter. Each of the latter circuits includes a coil of inductance L and a capacitor of capacitance C2. The specific values of inductance and capacitance for the parallel LC circuits, and of capacitor C1 for the series capacitance are determined in accordance with well-known expressions involving low and high cutoff frequencies $f_1$ and $f_2$ for the desired passband and involving the resistance of a terminating resistor 30. In addition, a current limiting resistor 31 is connected in series in the signal path of the filter at the input side thereof.

Figure 3:
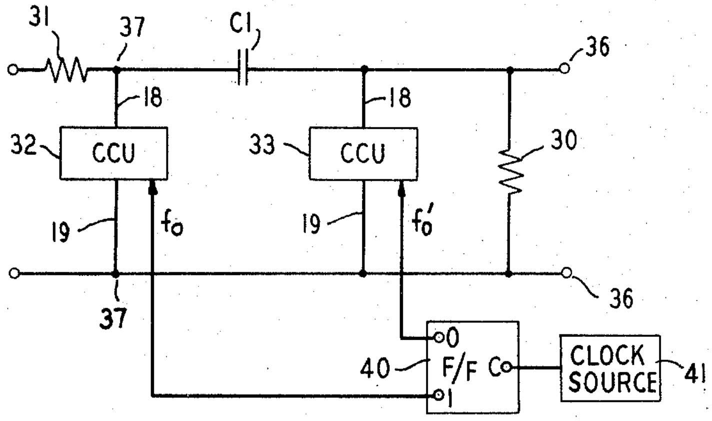
FIG. 3 is a schematic diagram of a 3-element $\pi$-section dynamic bandpass filter in accordance with the present invention.

As has been earlier observed, a direct substitution of commutating capacitor units 32 and 33 of FIG. 3 for the parallel LC circuits 28 and 29 of FIG. 2 produces a response, at output terminals 36 in FIG. 3, which is essentially the same as the response at terminals 37 when the units 32 and 33 are driven in step with one another. In other words, when two units are driven in phase with one another, the overall filter response of the FIG. 3 circuit is very low at the lower cutoff frequency $f_1$ of the bandpass response and very high at the upper cutoff frequency $f_2$ of the bandpass response. However, it has been found that by applying commutating switching drive for the two units in different phases, i.e., with a 30° phase difference (as measured on an $f_0$ signal wave) between the two drives, the typical bandpass filter response of the 3-element $\pi$-section filter of FIG. 2 is also produced by the circuit of FIG. 3. This difference in phase between the drives of the two commutating capacitor units 32 and 33 is schematically represented in FIG. 3 by the arrows $f_0$ and $f'_0$ on those units, respectively.

Commutating capacitor units of the type shown in FIG. 3 of my copending application are advantageously employed for the units 32 and 33 of FIG. 3. In such a unit shift register outputs are applied to control field effect transistor gates for sequentially connecting commutating capacitor unit input and output connections to capacitor circuit terminals. Those units are driven for commutation in a common sequence but in different phases. In that embodiment, shift signals are applied from a clock source to the unit shift register at a frequency $6f_0$. In order to achieve the desired 30° phase difference between drives for units 32 and 33 herein, drive signals at the same $6f_0$ rate are advantageously provided from the binary ONE and ZERO output connections, respectively, of a flip-flop circuit 40 which is driven as a single-stage binary counter from a clock source 41 running at a frequency $12f_0$.

Both commutating capacitor units 32 and 33 of FIG. 3 utilize capacitors of the same capacitance C shown in FIG. 1A. The actual size of that capacitance in relation to the capacitance of capacitor C1 and to the frequency $f_0$ determines the spread between the high and low cutoff frequencies of the desired passband. It has been found that the maximum dip between peaks of the response characteristic is about three-fourths decibel regardless of the sizes of resistors 30 and 31. When those resistors are inserted in the circuit the dip is reduced. The dip disappears and the overall characteristic becomes rounded as their resistances decrease. Regardless of which of the units 32 and 33 is driven in leading phase, the commutating frequency $f_0$ is adjacent to the upper cutoff frequency $f_2$ of the bandpass filter. Signal phase shift through the filter of FIG. 3 is similar to that through the corresponding static bandpass filter of FIG. 2. By way of illustration of one specific example of a filter as shown in FIG. 3, assume low and high cutoff frequencies of $f_1 = 2025$ hertz and $f_2 = 2225$ hertz. Each commutating capacitor unit has three capacitors of 1.5 nanofarads each, the commutating frequency $f_0 = 2225$ hertz, and the series input resistor 31 and shunt output terminating resistor 30 are each 500 kilohms. The series capacitor C1 is 270 picofarads. It can be shown that the resistances of resistors 30 and 31 and the capacitance of capacitor C1 are the same as the corresponding elements of a prior art filter of the type shown in FIG. 2, which has the same cutoff frequencies.

Although the present invention has been described in connection with a particular application thereof, it is to be understood that other applications, modifications, and embodiments which will be obvious to those skilled in the art are included within the spirit and scope of the invention.

What is claimed is:

1. In combination, a bandpass filter comprising a plurality of commutating capacitor units connected in a like plurality of shunt branches of said filter, each of said units including a plurality of interconnected capacitors and means for commutating said interconnected capacitors between input and output connections of such unit, and means for driving said commutating means for each of said units in different phases with respect to one another for substantially equalizing responses of said filter at cutoff frequencies thereof.

2. The combination in accordance with claim 1 in which, two of said units are provided, and said driving means comprises means for driving said units at approximately a 30° phase difference with respect to one another as measured on a wave of the frequency of commutation of one of said units.

3. The combination in accordance with claim 1 in which, two of said units are provided, and each of said units includes at least three interconnected capacitors all of approximately the same capacitance.

4. The combination in accordance with claim 1 in which said filter comprises, a 3-element, $\pi$-section, bandpass filter having an impedance connected in series in a through signal path of said filter between connection points for successive ones of said plurality of shunt branches.

5. The combination in accordance with claim 1 in which each of said units comprises, an input connection and an output connection, a plurality of capacitors interconnected with one another in a circuit having a predetermined number, greater than two, of terminals, and means for coupling the terminals of different paired combinations of said terminals to said input and output connections, respectively, in a predetermined recurring sequence of time intervals, each of said combinations including in series therebetween at least two of said capacitors.

6. A signal frequency sensitive circuit comprising a plurality of interconnected commutatable capacitor units, each of said units including a plurality of interconnected capacitors, and means for commutating different combinations of said interconnected capacitors through a predetermined sequence of connection combinations between input and output connections of such unit, each of said combinations including at least two capacitors, and means for driving said commutating means for each of said interconnected units in different phase with respect to one another.

7. The frequency sensitive circuit in accordance with claim 6 in which, each of said combinations includes means for connecting said two capacitors in series between the input and output terminals of the unit including such capacitors, and each of the two capacitors is also included in a different one of said combinations, respectively.

8. A signal frequency sensitive circuit comprising a plurality of interconnected commutatable capacitor units, each of said units including a plurality of interconnected capacitors and means for commutating said interconnected capacitors through a predetermined sequence of connection combinations between input and output connections of such unit, said sequence of combinations including the connection of each combination once with each polarity between said input and output connections, and means for driving said commutating means for each of said interconnected units in different phases with respect to one another.

* * * * *